United States Patent [19]

Zybell et al.

[11] Patent Number: 5,250,475

[45] Date of Patent: Oct. 5, 1993

[54] BLACK GLASS PASTES FOR GLAZING AND THEIR PRODUCTION

[75] Inventors: Paul Zybell, Dalmine; Ruggero Bertocchi, Capriate S.G., both of Italy

[73] Assignee: Bayer S.p.A.

[21] Appl. No.: 848,154

[22] Filed: Mar. 9, 1992

[30] Foreign Application Priority Data

Mar. 20, 1991 [IT] Italy .......................... MI-91A000747

[51] Int. Cl.$^5$ .......................... C03C 8/14; C03C 8/16; C03C 8/10
[52] U.S. Cl. .......................... 501/17; 501/20; 501/22; 501/75
[58] Field of Search .......................... 501/14, 17, 20, 22, 501/32, 75

[56] References Cited

U.S. PATENT DOCUMENTS 4,822,396 4/1989 Reinherz et al. .......................... 65/107

FOREIGN PATENT DOCUMENTS 0377062 11/1990 European Pat. Off. .
755929 11/1953 Fed. Rep. of Germany .
2451282 5/1976 Fed. Rep. of Germany ........ 301/75
2621308 7/1989 France .

Primary Examiner—Mark L. Bell
Assistant Examiner—C. M. Bonner
Attorney, Agent, or Firm—Connolly & Hutz

[57] ABSTRACT

Black glass pastes for edging glass windows in automobiles comprise ground, lead-containing modified borosilicate glass which has sulfides or polysulfide fused therein, black ground pigment and a carrier medium which is liquid at room temperature or higher, is produced by fusing a mixture of lead-containing borosilicate glass, powdered carbon and metal sulfides an sulfur powder or the resulting frit together with black pigments to a particle fineness of less than 10 μm and mixing the ground product with a carrier medium which is liquid at room temperature or elevated temperature, thereby forming a paste.

7 Claims, No Drawings

BLACK GLASS PASTES FOR GLAZING AND THEIR PRODUCTION

This invention relates to glass-like black pastes, to a process for their production and to their use in the production of glazing.

BACKGROUND OF THE INVENTION

It is known that, in auto glazing for example, the black-colored edge is a general requirement for direct bonding of the glass panes onto auto bodies:
1. to protect the organic adhesive against UV radiation; and
2. to guarantee an aesthetically optimal finish.

Black pastes are glass-like fusion products which are mixed with black pigments and applied in paste form to auto glass panes by the screen printing process and subsequently baked, the baking temperature being in the vicinity of the softening point of the glass substrate in order to combine stoving of the black edge with shaping of the pane.

The quality of black glass paints for heated rear windows has to satisfy particularly stringent requirements because the black edge is printed onto the float side of the glass. After curing, the busbar is generally applied locally by screen printing in the form of a silver paste to the as yet unbaked black edge layer with the object of baking both layers together, the glass panes being simultaneously pressed into their intended shape and subsequently tempered. In addition, the black edge should not leave any residues behind on the pressing tools during the shaping process.

For a layer thickness of approx. 15 $\mu$m, the edge of the rear window should have a strong neutral black color, should be absolutely opaque with a smooth and compact surface and should ensure good adhesion to the glass coupled with good scratch resistance and chemical stability. The silver busbar, which is approximately 13 $\mu$m thick, must not be visible under glass, but should have good soldering properties on the screen printing side to guarantee the busbar a separation strength of at least 15 kg.

Black glass pastes for auto windshields, rear windows and side windows have been used for years. They generally consist of 45 to 65% by weight of a lead-containing borosilicate glass which is often pre-colored with metal oxides in the melt and has a softening point below 600° C. The opacity of the glass layer or the strength of color is guaranteed by the addition of 12 to 35% by weight metal oxides or inorganic pigments during grinding of the glass frit. The pigments are fused on the glass surface during the heat treatment of the glass, i.e. at 570° to 720° C. Media which are liquid at room temperature or at elevated temperature are required for the application of the glass pastes to the glass by screen printing, being available in a wide choice according to the technique applied. The media in question are water-friendly or oil media, thermoplastics or polymers. Polymers cure under the effect of ultraviolet light. Metallic zinc and tin oxide are often used as additives for the glass pastes used for rear windows to prevent the black band film from adhering to the surface of the pressing tools during shaping of the glass (US 4,684,388).

Several reactions take place in the approx. 15 $\mu$m thick black band film during the heat treatment of the rear window.

The organic additives of the media evaporate or burn at temperatures of up to 450° C. The glass finally reaches its softening point of around 700° C. (depending on the composition of the glass) which is necessary on the one hand for the shaping process and, on the other hand, for the glass matrix of the black band to bind the pigment to the glass surface. In this phase, silver ions of the busbar can migrate through the black band and react with the tin coating of the float glass side with incorporation of the coloring oxides added. As a result, the silver busbar can become distinctly visible under glass at the black edge or the opacity in this region can be reduced. The black thus varies in color.

Accordingly, the problem addressed by the present invention was to provide a black paste which would prevent the silver from migrating during the baking process and which, at the same time, would improve the opacity of the black edge and intensify the black color.

This problem has been solved by the glass-like black paste according to the invention.

BRIEF DESCRIPTION OF THE INVENTION

Black glass pastes for edging glass windows in automobiles comprise ground, lead-containing modified borosilicate glass which has sulfides or polysulfide fused therein, black ground pigment and a carrier medium which is liquid at room temperature or higher, is produced by fusing a mixture of lead-containing borosilicate glass, powdered carbon and metal sulfides and sulfur powder or the resulting frit together with black pigments to a particle fineness of less than 10 $\mu$m and mixing the ground product with a carrier medium which is liquid at room temperature or elevated temperature, hereby forming a paste.

DETAILED DESCRIPTION

The present invention relates to black glass pastes based on lead-containing borosilicate glasses which are characterized in that the pastes contain ground, lead containing borosilicate glasses which, in addition to their oxidic composition, also include sulfides and/or polysulfides, black ground pigments and media which are liquid at room temperature or elevated temperature.

The black glass paste preferably contains 40 to 75% by weight lead-containing, modified borosilicate glasses, 10 to 35% by weight black pigments an 15 to 25% by weight of the media liquid at room temperature or elevated temperature.

In a preferred embodiment, the black glass paste additionally contains 1 to 10% by weight dark-colored heavy metal sulfides having a thermal dissociation temperature above 1,000° C., such as lead sulfide for example.

The percentage content of sulfides and/or polysulfides in the lead-containing borosilicate glasses is preferably from 0.1 to 12% by weight and, more preferably, from 0.5 to 8% by weight.

The present invention also relates to a process for the production of the black glass pastes according to the invention based on lead-containing borosilicate glasses, characterized in that the starting materials on which the lead-containing borosilicate glasses are based are mixed with metal sulfides and/or sulfur powder and fine carbon and the mixture is subsequently fused, the resulting frit is ground together with black pigments to a particle fineness of <10 $\mu$m and the ground product is mixed with media liquid at room temperature or elevated temperature to form a paste.

In a preferred embodiment, 5 to 30% by weight heavy metal sulfides, more particularly lead, iron and zinc sulfides, and/or 0.5 to 5% by weight sulfur powder and 0.5 to 2% by weight fine carbon are mixed with the corresponding starting materials of the lead-containing borosilicate glasses.

The raw materials are melted together with the metal sulfides and/or sulfur powder and fine carbon at a temperature preferably in the range from 1,200° to 1,350° C., depending on the composition of the raw material mixture.

Lead-containing borosilicate glasses generally have the following oxidic composition:
54-58% by weight PbO
30-34% by weight $SiO_2$
8-9% by weight $B_2O_3$
3-4% by weight $Al_2O_3$.

In a particularly preferred embodiment, 40 to 75% by weight of the modified, lead-containing ground borosilicate glasses and 10 to 35% by weight of the black ground pigments are mixed with 15 to 25% by weight liquid media, based on the total weight of the paste, optionally at elevated temperature.

The effect of the sulfides and/or polysulfide in the glass matrix may be additionally supported by the addition 1 to 10% by weight dark-colored heavy metal sulfides having a thermal dissociation temperature above 1,000° C., such as lead sulfide for example. These heavy metal sulfides are introduced during the grinding of the sulfidic glass with black spinel pigments and the subsequent formation of a paste with liquid media for application by screen printing.

The black glass pastes according to the invention are used in the production of the black edges on glazing.

The black glass pastes are preferably applied to the glazing by screen printing.

The black glass pastes according to the invention with the sulfide content in the borosilicate glass afford significant advantages over known black glass pastes because the opacity of these pastes is so high that, even in reduced layer thicknesses of less than 15 μm, they can still be safely processed. Moreover, they require smaller additions of pigments compared with sulfide-free glasses Since, in addition, the silver applied as the busbar diffuses to a lesser extent into the black band according to the invention, the soldering properties and adhesive strength of the contacts are improved.

However, particular advantages lie in the considerably increased impermeability to UV radiation and, hence, in the increased protection of the organic adhesive for direct bonding of the glass onto bodywork.

The following Examples are intended to illustrate the invention without limiting it in any way.

EXAMPLES

Example 1 (Comparison)

1 kg of a raw-material mixture consisting of 29.6% by weight silica flour, 3.2% by weight aluminum oxide, 14.7% by weight boric acid and 52.5% by weight lead oxide is homogeneously melted for 25 minutes at approx. 1,300° C. in a fireclay crucible. This frit serves as starting material for grinding with 25% of a black spinel pigment based on Cr/Cu/Fe/Co to a particle size of <10 μm. The ground material is then made into a paste with an oil medium. The paste thus prepared is applied by screen printing (77 mesh/cm screen) to the float side of a 4 mm glass pane, dried and then coated a second time with a 75% silver paste locally applied by screen printing (77 mesh/cm screen) and dried. The glass pane is then stoved for 4 mins. at 680° C. and tempered in a stream of compressed air. The silver applied stands out clearly under glass on the window produced in this way. Accordingly, the paste is of no industrial value.

Example 2 (Invention)

The same raw-material mixture as in Example 1 was again used, except that the raw materials were fused with an addition of 3% by weight sulfur powder and 1.5% by weight fine carbon. After further processing as described in Example 1, the black band applied is so opaque after baking that the silver layer on the back of the glass is no longer visible.

This paste is suitable for use on an industrial scale because the other data and specific properties, such as surface quality, adhesive strength, chemical stability and soldering properties, are also satisfactory.

Example 3 (Invention)

The same raw-material mixture as in Example 1 was again used, except that the raw materials were fused with an addition of 20% by weight zinc sulfide. After further processing as described in Example 1, the black band applied shows good opacity and strength of color after baking so that the silver applied is no longer visible under glass.

Example 4 (Invention)

The same raw-material mixture as in Example 1 was again used, except that one third of the lead oxide content of the mixture was replaced by 19% lead sulfide and the mixture as a whole was fused with 1.5% by weight fine carbon. After further processing as described in Example 1, the baked black band showed high opacity. The silver applied is no longer visible under glass.

Example 5 (Invention)

The glass matrix fused with 3% by weight sulfur powder and 1.5% by weight fine carbon in Example 2 was again used. During further processing as described in Example 1, the glass matrix was additionally ground with 5% by weight lead sulfide and then made into a paste with an oil medium.

After baking, the black band applied showed good opacity and depth of color and the silver applied is no longer visible under glass.

What is claimed is:

1. Black glass paste comprising ground, sulfide or polysulfide modified lead borosilicate glass which has 0.1 to 12% by weight - based on borosilicate glass - of sulfides and/or polysulfides fused therein, 10 to 35% by weight of black ground inorganic pigments and 15 to 25% by weight of a carrier medium.

2. Black glass paste claimed in claim 1 which comprises 40 to 75% by weight of lead borosilicate glass.

3. Black glass paste as claimed in claim 1 which additionally contain 1 to 10% by weight of dark-colored heavy metal sulfides having a thermal dissociation temperature above 1,000° C.

4. A process for the production of the black glass paste claimed in claim 1 which comprises fusing a mixture of lead borosilicate glass, 0.5 to 2% by weight of powdered carbon and 5 to 30% by weight of metal sulfides and/or 0.5 to 5% by weight of sulfur powder to produce a sulfide or polysulfide modified frit, grinding the resulting frit together with 10 to 35% by weight of black inorganic pigments to a particle fineness of less than 10 μm and mixing the ground product with 15 to 25% by weight of a carrier medium, based on the total weight of the paste, thereby forming a paste.

5. A process as claimed in claim 4 wherein the borosilicate glass is fused with the powdered carbon and metal sulfides and/or sulfur powder at a temperature of 1,200 to 1,350° C.

6. A process as claimed in claim 4 wherein 40 to 75% by weight of the sulfide or polysulfide modified frit is ground with the black inorganic pigments and the product is mixed with the carrier medium.

7. A process as claimed in claim 4 wherein 1 to 10% by weight, based on the total weight of the paste, of dark-colored heavy metal sulfide having a thermal dissociation temperature above 1,000° C. is additionally ground with the frit.

* * * * *